United States Patent
Flota

(10) Patent No.: US 10,246,164 B1
(45) Date of Patent: Apr. 2, 2019

(54) SLIDING BOAT WINDSHIELD

(71) Applicant: Joseph Flota, Edgewater, FL (US)

(72) Inventor: Joseph Flota, Edgewater, FL (US)

(73) Assignee: R.J. DOUGHERTY ASSOCIATES LLC, Edgewater, FL (US)

( * ) Notice: Subject to any disclaimer, the term of this patent is extended or adjusted under 35 U.S.C. 154(b) by 0 days.

(21) Appl. No.: 16/129,449

(22) Filed: Sep. 12, 2018

Related U.S. Application Data

(60) Provisional application No. 62/724,431, filed on Aug. 29, 2018.

(51) Int. Cl.
  *B63B 19/02* (2006.01)
  *B60J 1/16* (2006.01)
  *E05F 15/632* (2015.01)
  *E05F 11/53* (2006.01)

(52) U.S. Cl.
  CPC ............... *B63B 19/02* (2013.01); *B60J 1/16* (2013.01); *E05F 11/535* (2013.01); *E05F 15/632* (2015.01); *E05Y 2900/514* (2013.01); *E05Y 2900/55* (2013.01)

(58) Field of Classification Search
  CPC .................................. B63B 19/02; B60J 1/16
  See application file for complete search history.

(56) References Cited

U.S. PATENT DOCUMENTS

| | | | |
|---|---|---|---|
| 3,161,895 A * | 12/1964 | Lewis | B63B 19/00 114/361 |
| 3,906,563 A | 9/1975 | Bramhall | |
| 5,784,833 A * | 7/1998 | Sponable | E05F 15/643 49/123 |
| 5,799,449 A * | 9/1998 | Lyons | B60J 1/1853 296/146.1 |
| 6,026,611 A | 2/2000 | Ralston et al. | |
| 7,182,038 B2 | 2/2007 | Dougherty | |
| 7,185,943 B2 | 3/2007 | Lesle et al. | |
| 7,424,861 B2 | 9/2008 | Mercier et al. | |
| 8,627,607 B2 | 1/2014 | Schulte et al. | |
| 9,233,734 B2 | 1/2016 | Erskine et al. | |
| 9,688,363 B1 * | 6/2017 | Marshall | B63B 29/02 |

* cited by examiner

*Primary Examiner* — S. Joseph Morano
*Assistant Examiner* — Jovon E Hayes
(74) *Attorney, Agent, or Firm* — Edward M. Livingston, Esq.; Bryan L. Loeffler, Esq.; Livingston Loeffler, P.A.

(57) ABSTRACT

A sliding windshield (1) for boats having at least two side panels (2, 3) and a center panel (4). The center panel is mounted to a header (15) having two curved channels (17, 18) that allow the center panel to slide forward or outward from two stationary side panels and then sideward in front of one of the two side panels into an open position.

18 Claims, 3 Drawing Sheets

SLIDING BOAT WINDSHIELD

CROSS-REFERENCE TO RELATED APPLICATION

This application claims priority to application No. 62/724,431, filed on Aug. 29, 2018, which is currently pending. The patent application identified above is incorporated herein by reference in its entirety to provide continuity of disclosure.

FIELD OF THE INVENTION

This invention relates to the windshields for boats and more particularly a windshield for a dual console having a sliding center panel.

BACKGROUND OF THE INVENTION

Passenger boats, such as dual console boats, provide a rear area and a forward area separated by a windshield. The rear area or cockpit provides a helm, storage and seating while the forward area provides seating near the bow of the boat.

Such dual console boats provide two consoles on opposing sides of the boat separated by a pass-through. The two consoles provide areas for controls and other electronics, while the pass-through provides access to the forward area of the boat. A windshield normally spans the width of the boat directly in front of the consoles and pass-through. The windshield in normally made up of three panels which include two side panels and a middle panel. The two side panels are fixedly mounted over the consoles and the middle console spans the area over the pass-through. The middle panel is normally attached to one of the side panels by one or more hinges, thereby allowing the center panel to be swung into an open position in which the center panel rests on top of the side panel to which it is hingedly attached.

A problem with this conventional configuration is that windshields have become heavier as safety standards and the quality of boats has increased. Therefore, the center panel has become increasingly difficult to open and in some cases dangerous to open and close especially if the center panel is inadvertently slammed open or shut. An additional problem is the clearance required in the forward area to open and close the center panel of the windshield as the center panel must swing through the area of the forward seating area, which may be obstructed by passengers or equipment.

Therefore, a need exists for a boat windshield having a center panel that is firmly supported during opening and closing and that requires a minimum amount of clearance to open or close.

SUMMARY OF THE INVENTION

The primary object of the present invention is to provide for a boat windshield having a center panel that is firmly supported during opening and closing and that requires a minimum amount of clearance to open or close.

The present invention fulfills the above and other objects by providing a windshield ideally for use on a dual console boat wherein two consoles are located on opposing sides of the boat separated by a pass-through. The two consoles provide areas for controls and other electronics, while the pass-through provides access to a forward area of the boat from a rear area of the boat. The windshield is made up of at least two side panels and a center panel.

The center panel is mounted to a header having two curved substantially L-shaped or J-shaped channels that allow the center panel to slide forward or outward from two stationary side panels and then sideward in front of one of the two side panels into an open position. The movement of the center panel may be controlled using one or more motors and an actuation mechanism, such as hydraulics, electric, gears and so forth. Mechanisms, such as guides, on the bottom edge of the center panel will interlock in tracks located on or adjacent to the bottom edge of at least one of the two side panels so that the bottom of the center panel will be secured when open or closed and also during travel to the fully open position.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
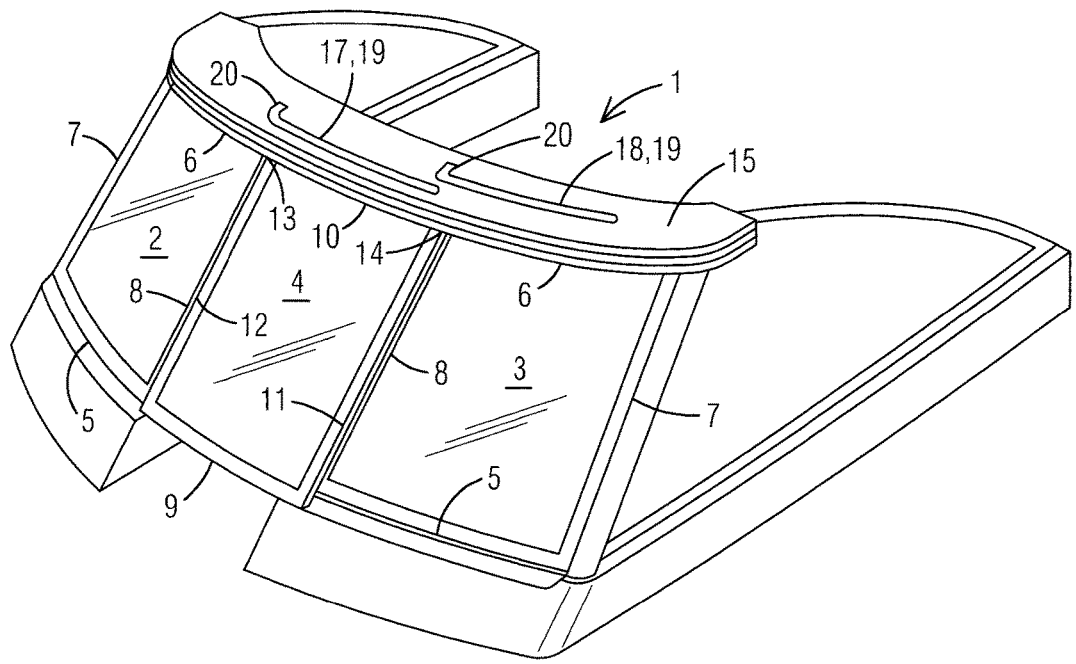
FIG. 1 is a front perspective plan view of a windshield of the present invention in a closed position and showing locations of channel guides.

For purposes of describing the preferred embodiment, the terminology used in reference to the numbered accessories in the drawings is as follows:

1. windshield, generally
2. starboard side panel
3. port side panel
4. center panel
5. bottom edge of side panel
6. top edge of side panel
7. outer edge of side panel
8. inner edge of side panel
9. bottom edge of center panel
10. top edge of center panel
11. port side edge of center panel
12. starboard side edge of center panel
13. starboard side top corner of center panel
14. port side top corner of center panel
15. header
16. opening
17. center channel guide
18. offset channel guide
19. parallel portion of channel guide
20. curved portion of channel guide
21. slideable engagement means
22. starboard side engagement means
23. port side engagement means 24. actuating means
25. hydraulic arm
26. pivot point
27. hanging bracket

DESCRIPTION OF THE PREFERRED
EMBODIMENTS

Figure 2:
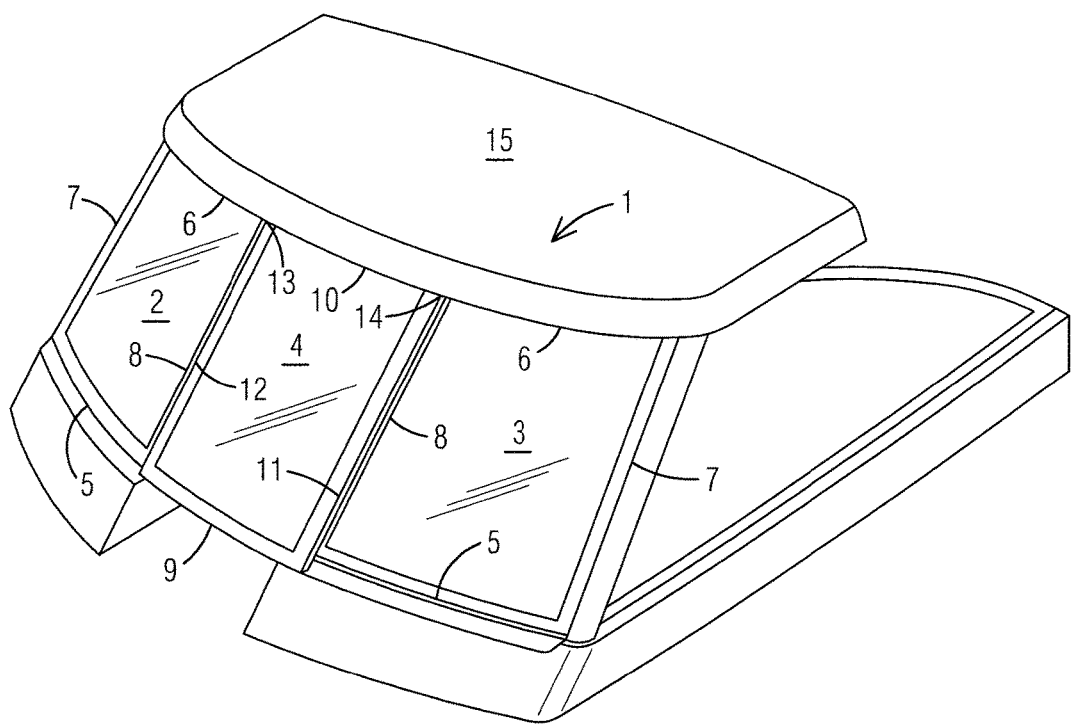
FIG. 2 is a front perspective view of a windshield of the present invention in a closed position.
Figure 3:
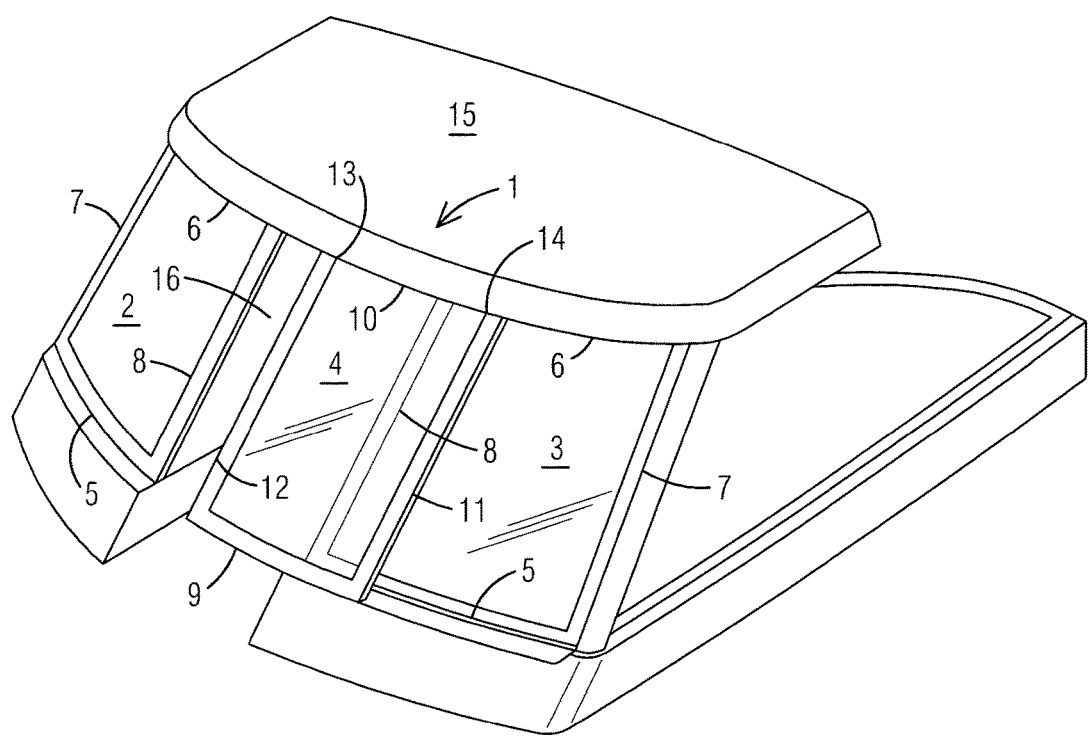
FIG. 3 is a front perspective view of a windshield of the present invention in a partially open position.
Figure 5:
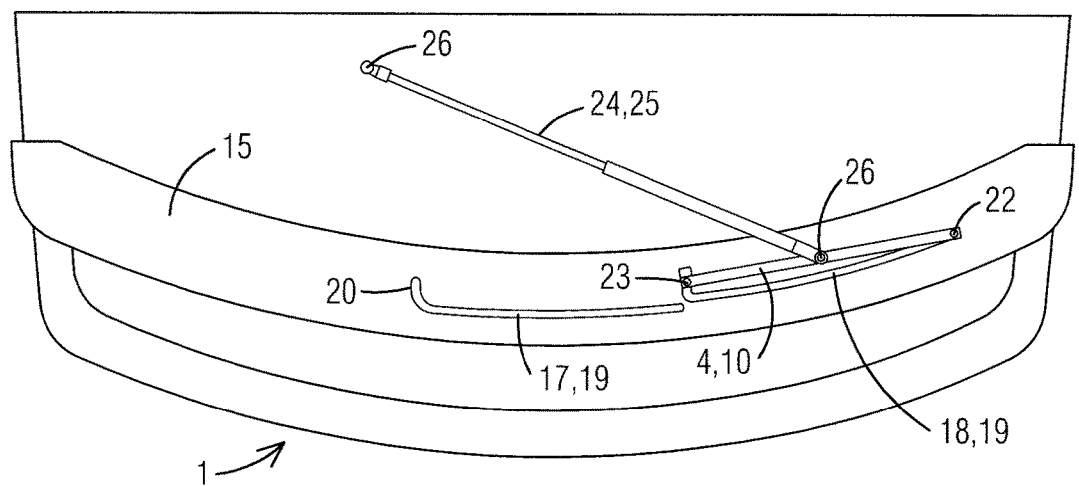
FIG. 5 is a top view of a header of the windshield of the present invention in an open position.

With reference to FIGS. 1-3, a front perspective view of the windshield 1 of the present invention is illustrated. The windshield 1 comprises a starboard side panel 2, a port side panel 3 and a center panel 4. The starboard side panel 2 and port side panel 3 each comprise a bottom edge 5, top edge 6, outer edge 7 and inner edge 8 wherein the inner edges 8 of the starboard side panel 2 and the port side panel 3 face each other. The center panel 4 is located between the starboard side panel 2 and port side panel 3 when the windshield 1 is in a closed position, as illustrated in FIGS. 1 and 2. Said center panel 4 comprises a bottom edge 9, a top edge 10, a side starboard side edge 11, a port side edge 12, a starboard side top corner 13 and a port side top corner 14. A support header 15 extends across top edges 6 of the starboard side panel 2 and port side panel 3 spanning an opening 16, as illustrated in FIG. 5, located between the inner edges 8 of the starboard side panel 2 and port side panel 3. Said opening 16 being covered by the center panel 4 when the center panel 4 is in a closed position. A substantially L-shaped center channel guide 17 and substantially L-shaped offset channel guide 18 are located on the header 15 to provide attachment points for the center panel 4 to the header 15 as well as a means for sliding the center panel 4 into an open position, as illustrated in FIG. 3, or closed position, as illustrated in FIGS. 1 and 2. Mechanisms, such as guides, on the bottom edge 9 of the center panel 4 will interlock in tracks located on or adjacent to the bottom edge 5 of the starboard side panel 2 and/or port side panel 3 so that the edge 9 of the center panel 4 will be secured when open or closed and also during travel to the fully open position.

Figure 4:
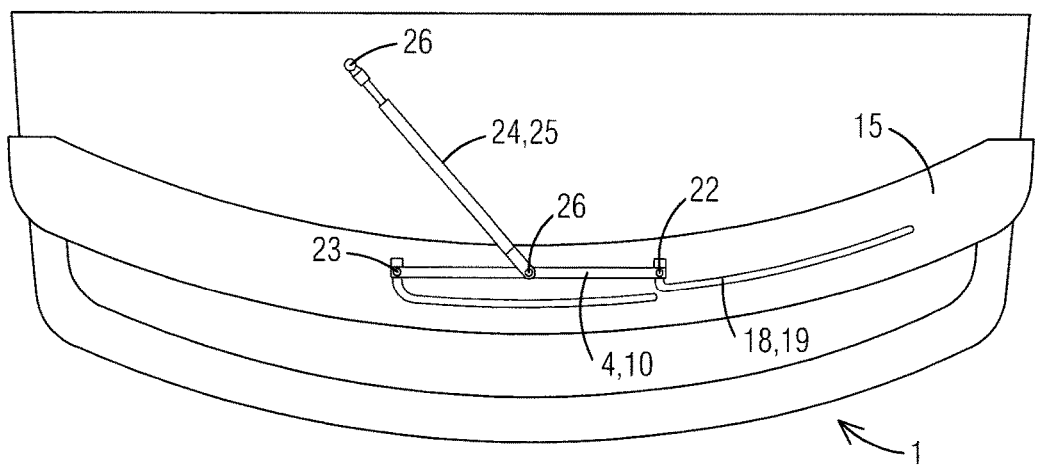
FIG. 4 is a top view of a header of the windshield of the present invention in a closed position.

With reference to FIGS. 4 and 5, top views of the header 15 and windshield 1 of the present invention in a closed position and in an open position, respectively, are illustrated. A substantially L-shaped or J-shaped curved center channel guide 17 and substantially L-shaped or J-shaped curved offset channel guide 18 are located on the header 15 to provide attachment points for the center panel 4 to the header 15 as well as a means for sliding the center panel 4 into a closed position, as illustrated in FIG. 4, and into an open position, as illustrated in FIG. 5. The center channel guide 17 is located primarily over the center panel 4 while the offset channel guide 18 is located primarily over the port side panel 3. The center channel guide 17 and offset channel guide 18 each channel comprises a parallel portion 19 and a curved perpendicular portion 20. The parallel portions 19 of both the center channel guide 17 and offset channel guide 18 are each parallel to the top edge 10 of the center panel 4. The perpendicular portions 20 of both the center channel guide 17 and offset channel guide 18 are each perpendicular to the top edge 10 of the center panel 4. Slideable engagement means 21, such as pins, dowels, pegs, wheels and so forth, are located on the top edge 10 of the center panel 4 preferably at or adjacent to the starboard side top corner 13 and port side top corner 14 of the center panel 4. A first and second slideable engagement means 21 engages the center channel guide 17 and offset channel guide 18. A starboard side engagement means 22 engages the channel guide 17 and a port side engagement means 23 engages the offset channel guide 18. This allows the center panel 4 to be pushed outward away from the starboard side panel 2 and port side panel 3 guided by perpendicular portion 20 of both the center channel guide 17 and offset channel guide 18 toward the bow of the boat; around corners of the substantially L-shaped or J-shaped center channel guide 17 and offset channel guide 18; and then sideways along the parallel portions 19 of both the center channel guide 17 and offset channel guide 18 into an open and stored position. As illustrated in FIG. 5, the center panel 4 is positioned in front of the port side panel 2 when placed in an open position. The center panel 4 may be manually opened and closed. Alternatively, the center panel 4 may be opened or closed via an actuating means 24, which as illustrated herein is an actuating hydraulic arm 25 connected to the top edge 10 of the center panel 4 via a pivot point 26. The actuating means 24 may also comprise an electric actuating mechanism, gears, belt drive, motor or equivalent means that allows the center panel 4 to be opened automatically. A control box connected to the actuating means 24 and operating switches allow the center panel 4 to automatically opened or closed to fully opened or closed positions or partially opened or closed positions. An adjustment means may also be provided to limit the opening and closing force required to move the center panel 4. A safety release may be integrated into the actuating means 24 to allow a user to release the actuating means 24 so the center panel 4 can be opened manually in case of a mechanical failure and/or emergency.

Figure 6:
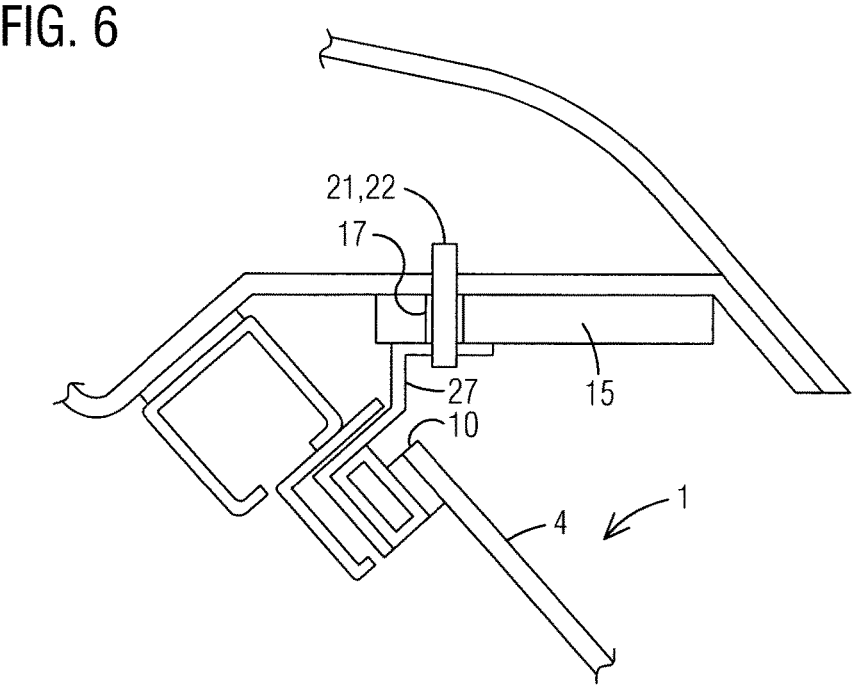
FIG. 6 is a side sectional view of the windshield of the present invention.

With reference to FIG. 6, a side sectional view of the windshield 1 of the present invention is illustrated. The center panel 4 is in an angled position in relation to the header 15. Therefore, an angled hanging bracket 27 is used to secure the top edge 10 of the center panel 4 to the header 15.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A boat windshield comprising:
   a starboard side panel, a port side panel and a center panel;
   said starboard side panel comprising a bottom edge, a top edge, an outer edge and an inner edge;
   said port side panel comprising a bottom edge, a top edge, an outer edge and an inner edge;
   said center panel being located between the starboard side panel and the port side panel when the windshield is in a closed position;
   said center panel comprising a bottom edge, a top edge, a side starboard side edge, a port side edge, a starboard side top corner and a port side top corner;
   a support header extending across the top edge of the starboard side panel, port side panel and spanning an opening located between the inner edges of the starboard side panel and port side panel;
   said opening being covered by the center panel when the center panel is in a closed position; and
   a curved center channel guide and curved offset channel guide located on the header to provide attachment points for the center panel to the header and a means for sliding the center panel into open and closed positions.

2. The boat windshield of claim 1 wherein:

said curved center channel guide is substantially L-shaped; and
said curved offset channel guide is substantially L-shaped.

3. The boat windshield of claim 1 wherein:
said curved center channel guide is substantially J-shaped; and
said curved offset channel guide is substantially J-shaped.

4. The boat windshield of claim 1 wherein:
said curved center channel guide comprises a parallel portion that is parallel to the top edge of the center panel;
said curved center channel guide comprises a perpendicular portion that is perpendicular to the top edge of the center panel;
said curved offset channel guide comprises a parallel portion that is parallel to the top edge of the center panel; and
said curved offset channel guide comprises a perpendicular portion that is perpendicular to the top edge of the center panel.

5. The boat windshield of claim 1 further comprising:
a first slideable engagement means located on the top edge of the center panel wherein said first slideable engagement means engages the center channel guide; and
a second slideable engagement means located on the top edge of the center panel wherein said second slideable engagement means engages the offset channel guide.

6. The boat windshield of claim 1 further comprising:
an actuating means for opening and closing the center panel of the windshield.

7. The boat windshield of claim 1 further comprising:
a hydraulic arm for opening and closing the center panel of the windshield.

8. A boat windshield comprising:
a starboard side panel, a port side panel and a center panel;
said starboard side panel comprising a bottom edge, a top edge, an outer edge and an inner edge;
said port side panel comprising a bottom edge, a top edge, an outer edge and an inner edge;
said center panel being located between the starboard side panel and the port side panel when the windshield is in a closed position;
said center panel comprising a bottom edge, a top edge, a side starboard side edge, a port side edge, a starboard side top corner and a port side top corner;
a support header extending across the top edge of the starboard side panel, port side panel and spanning an opening located between the inner edges of the starboard side panel and port side panel;
said opening being covered by the center panel when the center panel is in a closed position;
a curved center channel guide and curved offset channel guide located on the header to provide attachment points for the center panel to the header and a means for sliding the center panel into open and closed positions; and
said curved center channel guide comprises a parallel portion that is parallel to the top edge of the center panel;
said curved center channel guide comprises a perpendicular portion that is perpendicular to the top edge of the center panel;
said curved offset channel guide comprises a parallel portion that is parallel to the top edge of the center panel; and
said curved offset channel guide comprises a perpendicular portion that is perpendicular to the top edge of the center panel.

9. The boat windshield of claim 8 wherein:
said curved center channel guide is substantially L-shaped; and
said curved offset channel guide is substantially L-shaped.

10. The boat windshield of claim 8 wherein:
said curved center channel guide is substantially J-shaped; and
said curved offset channel guide is substantially J-shaped.

11. The boat windshield of claim 8 further comprising:
a first slideable engagement means located on the top edge of the center panel wherein said first slideable engagement means engages the center channel guide; and
a second slideable engagement means located on the top edge of the center panel wherein said second slideable engagement means engages the offset channel guide.

12. The boat windshield of claim 8 further comprising:
an actuating means for opening and closing the center panel of the windshield.

13. The boat windshield of claim 8 further comprising:
a hydraulic arm for opening and closing the center panel of the windshield.

14. A boat windshield comprising:
a starboard side panel, a port side panel and a center panel;
said starboard side panel comprising a bottom edge, a top edge, an outer edge and an inner edge;
said port side panel comprising a bottom edge, a top edge, an outer edge and an inner edge;
said center panel being located between the starboard side panel and the port side panel when the windshield is in a closed position;
said center panel comprising a bottom edge, a top edge, a side starboard side edge, a port side edge, a starboard side top corner and a port side top corner;
a support header extending across the top edge of the starboard side panel, port side panel and spanning an opening located between the inner edges of the starboard side panel and port side panel;
said opening being covered by the center panel when the center panel is in a closed position;
a curved center channel guide and curved offset channel guide located on the header to provide attachment points for the center panel to the header and a means for sliding the center panel into open and closed positions; and
said curved center channel guide comprises a parallel portion that is parallel to the top edge of the center panel;
said curved center channel guide comprises a perpendicular portion that is perpendicular to the top edge of the center panel;
said curved offset channel guide comprises a parallel portion that is parallel to the top edge of the center panel;
said curved offset channel guide comprises a perpendicular portion that is perpendicular to the top edge of the center panel;
a first slideable engagement means located on the top edge of the center panel wherein said first slideable engagement means engages the center channel guide; and
a second slideable engagement means located on the top edge of the center panel wherein said second slideable engagement means engages the offset channel guide.

15. The boat windshield of claim 14 wherein:

said curved center channel guide is substantially L-shaped; and said curved offset channel guide is substantially L-shaped.

16. The boat windshield of claim 14 wherein:

said curved center channel guide is substantially J-shaped; and said curved offset channel guide is substantially J-shaped.

17. The boat windshield of claim 14 further comprising:

an actuating means for opening and closing the center panel of the windshield.

18. The boat windshield of claim 8 further comprising:

a hydraulic arm for opening and closing the center panel of the windshield.

* * * * *